(12) United States Patent
Sato et al.

(10) Patent No.: US 9,886,411 B2
(45) Date of Patent: Feb. 6, 2018

(54) DATA TRANSFER DEVICE AND DATA TRANSFER METHOD

(71) Applicant: Mitsubishi Electric Corporation, Chiyoda-ku (JP)

(72) Inventors: Hidenori Sato, Tokyo (JP); Toshio Nakajima, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 209 days.

(21) Appl. No.: 14/763,941

(22) PCT Filed: Apr. 10, 2013

(86) PCT No.: PCT/JP2013/060833
§ 371 (c)(1),
(2) Date: Jul. 28, 2015

(87) PCT Pub. No.: WO2014/167670
PCT Pub. Date: Oct. 16, 2014

(65) Prior Publication Data
US 2015/0363351 A1    Dec. 17, 2015

(51) Int. Cl.
*G06F 13/42* (2006.01)
*G06F 13/40* (2006.01)
*G06F 13/28* (2006.01)

(52) U.S. Cl.
CPC .......... *G06F 13/4221* (2013.01); *G06F 13/28* (2013.01); *G06F 13/4068* (2013.01)

(58) Field of Classification Search
CPC ........... G06F 13/20; G06F 13/28; G06F 13/40
See application file for complete search history.

(56) References Cited

U.S. PATENT DOCUMENTS

| 5,367,639 A | 11/1994 | Sodos |
| 5,553,031 A | 9/1996 | Kimura |

(Continued)

FOREIGN PATENT DOCUMENTS

| JP | 4 296960 | 10/1992 |
| JP | 6 236341 | 8/1994 |

(Continued)

OTHER PUBLICATIONS

International Search Report dated May 14, 2013 in PCT/JP2013/060833 filed Apr. 10, 2013.

(Continued)

*Primary Examiner* — Henry Tsai
*Assistant Examiner* — Christopher a Daley
(74) *Attorney, Agent, or Firm* — Oblon, McClelland, Maier & Neustadt, L.L.P.

(57) ABSTRACT

A data transfer device performing data transfer at a high speed if a descriptor chain cannot be entirely transferred by a single activation. In a DMA control device, when a transfer activation signal is asserted, a descriptor information control part sequentially reads descriptor information from a descriptor information storage part. When the count of pieces of descriptor information that have been read becomes equal to a transferable frame count, a backward skip control part outputs a backward skip instruction. When the backward skip instruction is outputted, a descriptor information control part skips reading remaining descriptor information.

7 Claims, 9 Drawing Sheets

(56) References Cited

U.S. PATENT DOCUMENTS

| | | | |
|---|---|---|---|
| 7,424,553 B1* | 9/2008 | Borrelli | H04L 49/90 709/230 |
| 7,860,370 B2* | 12/2010 | Kuno | G11B 27/105 386/351 |
| 8,065,448 B2 | 11/2011 | Kawahara | |
| 8,959,261 B2* | 2/2015 | Ohta | G06F 13/28 710/39 |
| 9,501,351 B2* | 11/2016 | Kim | G06F 11/1008 |
| 2005/0216605 A1* | 9/2005 | Muro | G06F 13/28 710/5 |
| 2006/0155895 A1* | 7/2006 | Matsuda | G06F 7/02 710/52 |
| 2009/0287858 A1 | 11/2009 | Kawahara | |

FOREIGN PATENT DOCUMENTS

| | | |
|---|---|---|
| JP | 7 36806 | 2/1995 |
| JP | 2001 325209 | 11/2001 |
| JP | 2002 278918 | 9/2002 |
| JP | 2009 277096 | 11/2009 |
| JP | 2012 14436 | 1/2012 |
| JP | 2012 73745 | 4/2012 |
| TW | 201303587 A | 1/2013 |

OTHER PUBLICATIONS

Office Action dated Dec. 29, 2015 in Taiwanese Patent Application No. 102118904 (with partial English translation).

* cited by examiner

Fig. 7

| DESCRIPTOR NUMBER | DESCRIPTOR INFORMATION | | | | |
|---|---|---|---|---|---|
| | NEXT-DESCRIPTOR NUMBER | HEAD ADDRESS | | FRAME TYPE | TRANSFER COMPLETE FLAG |
| 0 | | | | | |
| 1 | | | | | |
| 2 | 3 | AAAA | AA | α | 0→1 |
| 3 | 4 | BBBB | BB | α | 0→1 |
| 4 | 5 | CCCC | CC | α | 0→1 |
| 5 | 6 | DDDD | DD | α | 0→1 |
| 6 | 7 | EEEE | EE | α | 0→1 |
| 7 | 8 | FFFF | FF | α | 0→1 |
| 8 | 23 | GGGG | GG | α | 0→1 |
| 9 | | | | | |
| 10 | | | | | |
| 11 | | | | | |
| 12 | | | | | |
| 13 | | | | | |
| 14 | 15 | HHHH | HH | β | 0 |
| 15 | 16 | JJJJ | JJ | β | 0 |
| 16 | 17 | KKKK | KK | β | 0 |
| 17 | 18 | LLLL | LL | β | 0 |
| 18 | 19 | MMMM | MM | β | 0 |
| 19 | 31 | NNNN | NN | β | 0 |
| 20 | | | | | |
| 21 | | | | | |
| 22 | | | | | |
| 23 | 24 | PPPP | PP | β | 0→1 |
| 24 | 25 | QQQQ | QQ | β | 0→1 |
| 25 | 26 | RRRR | RR | β | 0→1 |
| 26 | 27 | SSSS | SS | β | 0→1 |
| 27 | 14 | TTTT | TT | β | 0 |
| 28 | | | | | |
| 29 | | | | | |
| 30 | | | | | |
| 31 | Last | UUUU | UU | γ | |

DATA TRANSFER DEVICE AND DATA TRANSFER METHOD

TECHNICAL FIELD

The present invention relates to a DMA (Direct Memory Access) control device which can transfer data of a plurality of frames by a single transfer activation.

BACKGROUND ART

Where a DMA transfer is to be conducted by making up a descriptor chain, in general, descriptor information is set in a register or memory, a control circuit reads the descriptor information, and the DMA transfer is executed according to the descriptor information that is read. The descriptor information includes information such as the head address of a transfer source, a transfer frame size, a next-descriptor number (address), and the last descriptor flag.

When conducting the DMA transfer, the entire descriptor chain cannot sometimes be transferred by a single activation as in a case where, for example, the count of frames that can be transferred by a single activation is limited.

Patent Literature 1 includes a description as follows. A 1-bit value indicating whether or not a DMA transfer is to be performed is added to descriptor information. If the readout value indicates that the transfer will not be performed, a control circuit does not transfer a pertinent frame but shifts to an operation of reading the next descriptor information.

CITATION LIST

Patent Literature

Patent Literature 1: JP 7-36806

SUMMARY OF INVENTION

Technical Problem

If a setting operation employing the method described in Patent Literature 1 is to be performed so as not to transfer a frame that will be untransferable, it is required to read also the descriptor information of the frame which will not be transferred.

Accordingly, particularly when there are a plurality of frames that will not be transferred, extra time is spent.

It is an object of the present invention to perform data transfer at a high speed in a case where an entire descriptor chain cannot be transferred by a single activation.

Solution to Problem

A data transfer device according to the present invention includes:

a descriptor information storage part to store descriptor information including control information of data transfer;

a descriptor information read part to sequentially read the descriptor information stored by the descriptor information storage part when a transfer activation signal is asserted;

a transfer determination part to take a count of pieces of descriptor information read by the descriptor information read part; and as long as the count taken is equal to or less than a predetermined transferable frame count, output control information included in the descriptor information, and when the count taken coincides with the transferable frame count, output a backward skip instruction; and a data transfer part to transfer data according to the control information outputted by the transfer determination part, wherein the descriptor information read part skips reading remaining descriptor information when the backward skip instruction is outputted by the transfer determination part.

Advantageous Effects of Invention

With the data transfer device according to the present invention, when frames are transferred until the transferable frame count is reached, reading of the descriptor information of subsequent frames is skipped. As a result, the transfer time can be shortened by a time saved for not having to read unnecessary descriptor information.

BRIEF DESCRIPTION OF DRAWINGS

FIG. 7 is an explanatory illustration of the operation of a DMA control device 100 according to Embodiment 4.

DESCRIPTION OF EMBODIMENTS

Embodiment 1.

Embodiment 1 will explain a DMA control device 100 which, when descriptor information corresponding to the count of transferable frames are read, skips reading of the descriptor information of subsequent frames.

Figure 1:
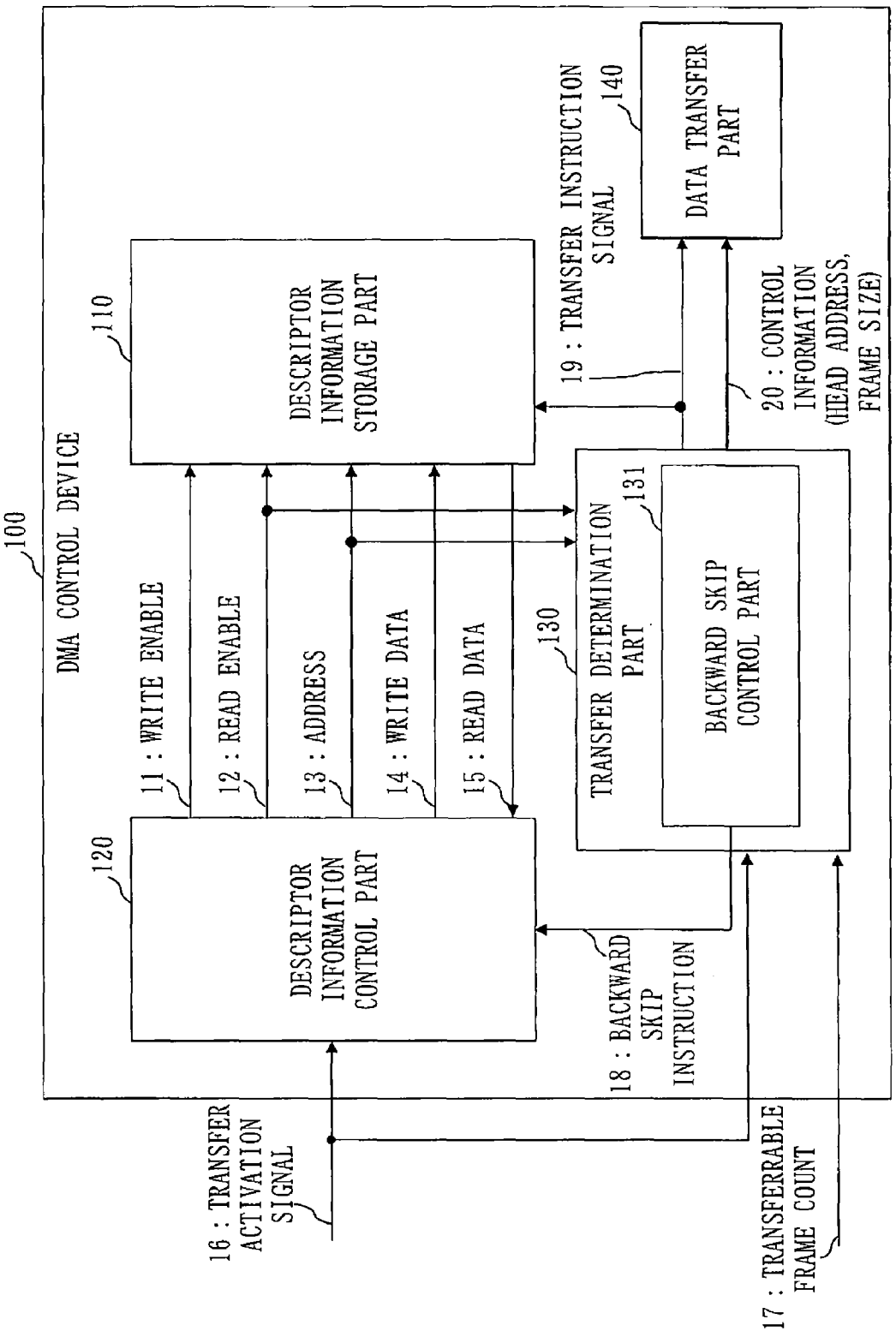
FIG. 1 is a block diagram illustrating the function of a DMA control device 100 according to Embodiment 1.

FIG. 1 is a block diagram illustrating the function of the DMA control device 100 (data transfer device) according to Embodiment 1.

The DMA control device 100 includes a descriptor information storage part 110, a descriptor information control part 120 (descriptor information read part), a transfer determination part 130, and a data transfer part 140. The transfer determination part 130 includes a backward skip control part 131.

The descriptor information storage part 110 is a memory to store descriptor information including the head address of a transfer source, a transfer frame size, a next-descriptor number (address), a transfer complete flag indicating whether or not transfer is complete or not, a last descriptor flag, and the like.

The descriptor information control part 120 outputs a write enable signal 11, a write destination address 13, and write data 14 to the descriptor information storage part 110 at the time of activation or at an arbitrary timing, and writes the descriptor information to the descriptor information storage part 110.

When a transfer activation signal 16 is asserted, the descriptor information control part 120 outputs a read enable signal 12 and the read destination address 13 to the descriptor information storage part 110 and reads descriptor information from the descriptor information storage part 110, as read data 15.

The transfer determination part 130 determines whether or not to conduct a frame transfer, based on a transfer complete flag in the read data 15 which is read by the descriptor information control part 120. If the transfer complete flag is 0, the transfer determination part 130 determines to conduct a frame transfer, and outputs a transfer instruction signal 19 and control information 20 (head address, frame size) to the data transfer part 140. If the transfer complete flag is 1, the transfer determination part 130 determines not to conduct a frame transfer, and does not output the transfer instruction signal 19 and control information 20.

The transfer instruction signal 19 is also outputted to the descriptor information storage part 110 to change the transfer complete flag of the descriptor information corresponding to the transferred frame, from 0 to 1.

The backward skip control part 131 starts taking the count of pieces of descriptor information whose transfer complete flags are 0 (that is, the count of frames to be transferred), out of pieces of descriptor information read by the descriptor information control part 120 since immediately after the transfer activation signal 16 is asserted. If the count of pieces of descriptor information that have been read coincides with a transferable frame count 17 asserted by a CPU, the backward skip control part 131 asserts a backward skip instruction 18 for the descriptor information control part 120.

When the backward skip instruction 18 is asserted, the descriptor information control part 120 skips the next and subsequent reading from the descriptor information storage part 110, and reads the last descriptor information.

Figure 2:
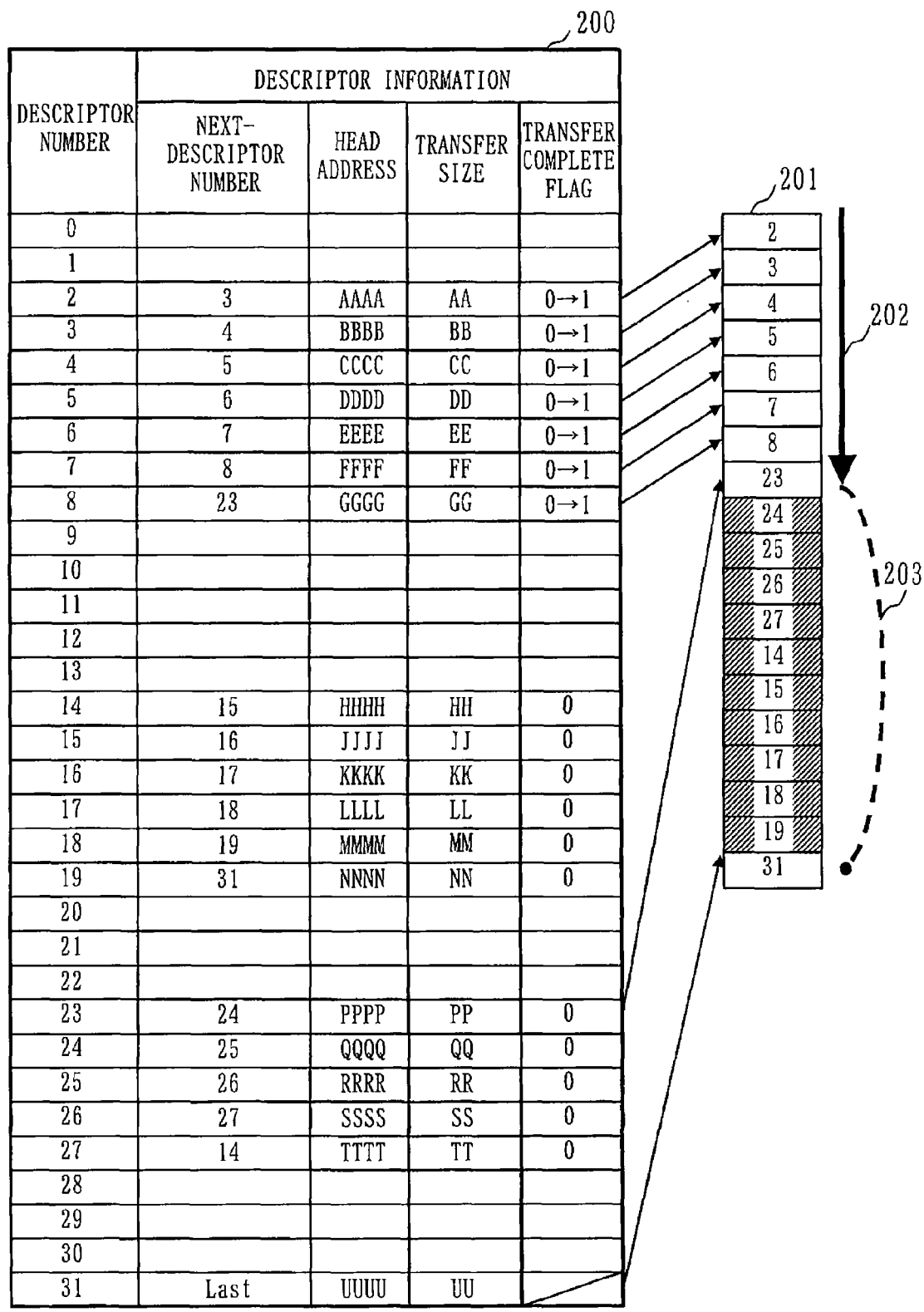
FIG. 2 is an explanatory illustration of the operation of the DMA control device 100 according to Embodiment 1.

FIG. 2 is an explanatory illustration of the operation of the DMA control device 100 according to Embodiment 1.

A table 200 expresses information stored by the descriptor information storage part 110.

A descriptor number is assigned to each piece of descriptor information. Each piece of descriptor information includes next-descriptor number representing the number for a descriptor to be read next, the head address of the transfer source, the transfer size, and the transfer complete flag.

Descriptor information whose next-descriptor number is Last is last descriptor information which is to be read last. In this embodiment, the next-descriptor number serves as a last descriptor flag indicating last descriptor information.

In FIG. 2, the count of descriptors that can be stored in the descriptor information storage part 110 is 32.

In FIG. 2, when the transfer is started with descriptor number 2, data of until descriptor number 8 are transferred sequentially. As the next-descriptor number of descriptor number 8 is 23, descriptor number 23 is transferred next to descriptor number 8. After the transfer of until descriptor number 27 is completed, descriptor number 14 is transferred. After the transfer of until descriptor number 19 is completed, the operation jumps to descriptor number 31 being the last descriptor information, and is ended. So far have been described a series of operations of the descriptor chain starting with descriptor number 2.

An array 201 is composed of descriptor numbers arranged according to the order in the descriptor chain.

Assume that the count of frames that can be transferred by a single transfer activation is limited to 8. In this case, the descriptor information control part 120 reads the descriptor information of until descriptor number 28 sequentially, as indicated by an arrow 202. Then, the transfer determination part 130 outputs control information 20 included in the descriptor information that have been read, to the data transfer part 140. The data transfer part 140 transfers data according to the control information 20.

When the descriptor information at descriptor number 23 is read, the count of pieces of descriptor information that have been read coincides with the transferable frame count 17. Hence, the backward skip control part 131 asserts the backward skip instruction 18. Then, the descriptor information control part 120 skips subsequent reading until last descriptor number 31, as indicated by a broken line 203.

The transfer complete flags of descriptor information corresponding to the frames that have been transferred change from 0 to 1, and these frames will not be transferred in response to the next and subsequent activations.

In this case, the last descriptor information at descriptor number 31 is not subject to frame count limitation and certainly read last. However, the operation need not always be performed in this manner.

As described above, when descriptor information corresponding to the transferable frames are read, the DMA control device 100 according to Embodiment 1 asserts the backward instruction 18 and skips reading the descriptor information of the subsequent frames. This can reduce unnecessary reading time.

Embodiment 2.

Embodiment 2 will explain a DMA control device 100 which skips reading descriptor information of frames that have been transferred in and before the last activation.

Figure 3:
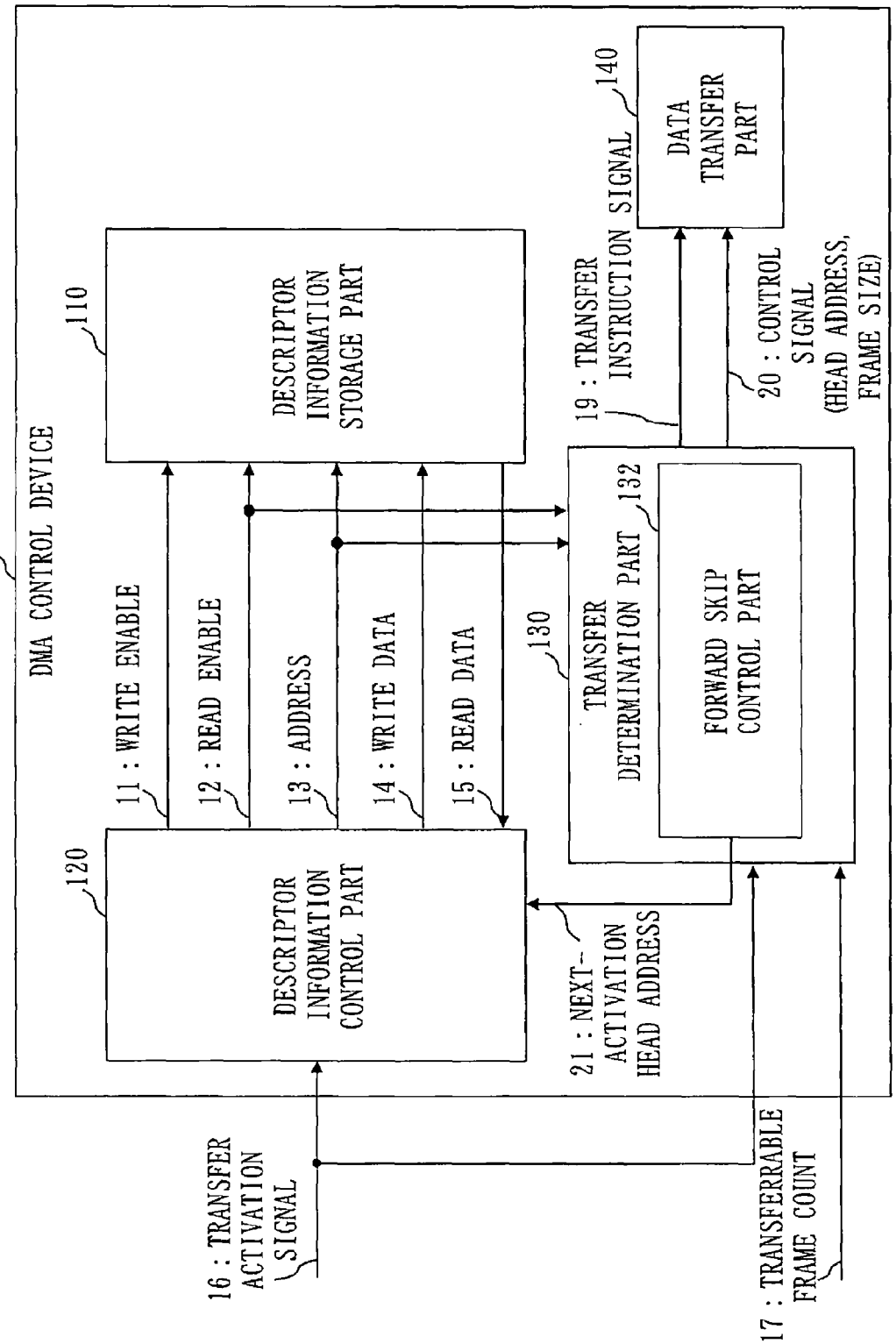
FIG. 3 is a block diagram illustrating the function of a DMA control device 100 according to Embodiment 2.

FIG. 3 is a block diagram illustrating the function of the DMA control device 100 according to Embodiment 2.

The DMA control device 100 illustrated in FIG. 3 is different from the DMA control device 100 illustrated in FIG. 1 in that a transfer determination part 130 includes a forward skip control part 132 in place of a backward skip control part 131.

The forward skip control part 132 starts taking the count of pieces of descriptor information (that is, the count of frames to be transferred) that have been read by a descriptor information control part 120 since immediately after a transfer activation signal 16 is asserted. When the count of pieces of descriptor information that have been read coincides with a transferable frame count 17 asserted by a CPU, the forward skip control part 132 outputs next-descriptor number included in the descriptor information to a descriptor information control part 120, as a next-activation head address 21.

When a new transfer activation signal 16 is asserted, the descriptor information control part 120 uses the next-activation head address 21 as the reading start address of the descriptor information storage part 110.

Figure 4:
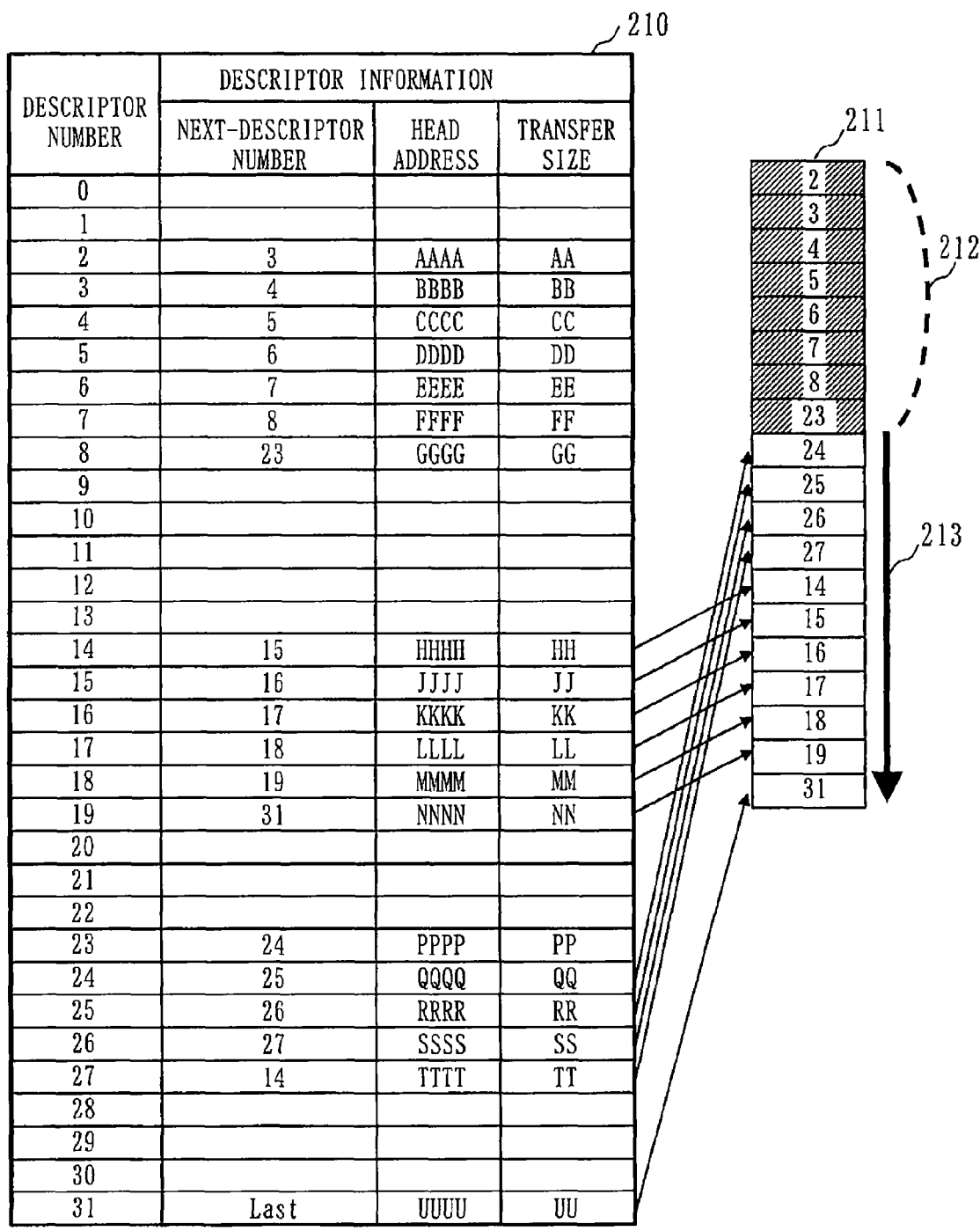
FIG. 4 is an explanatory illustration of the operation of the DMA control device 100 according to Embodiment 2.

FIG. 4 is an explanatory illustration of the operation of the DMA control device 100 according to Embodiment 2.

A table 210 expresses information stored by a descriptor information storage part 110. The table 210 illustrated in FIG. 4 is different from the table 200 illustrated in FIG. 2 in the absence of transfer complete flags.

An array 211 is composed of descriptor numbers arranged according to the order in the descriptor chain.

Assume that the count of frames that can be transferred by a single transfer activation is limited to 8. In this case, the descriptor information control part 120 reads the descriptor information of until descriptor number 31 sequentially.

When the descriptor information at descriptor number 23 is read, the count of pieces of descriptor information that have been read coincides with the transferable frame count 17. Hence, the transfer determination part 130 outputs control information 20 included in the descriptor information of until the descriptor information at descriptor number 23, to a data transfer part 140, and the data transfer part 140 conducts data transfer according to the control information 20. The forward skip control part 132 outputs next-descriptor number 24 included in the descriptor information at descriptor number 23, as a next-activation head address 21.

In the second transfer activation, the descriptor information control part 120 skips reading descriptor information of until descriptor number 23 according to the next-activation head address 21, as indicated by a broken line 212, and starts reading with descriptor number 24, as indicated by an arrow 213. The descriptor information control part 120 reads descriptor information sequentially from descriptor number 24 through descriptor number 31, being the last descriptor information, as indicated by the arrow 213.

When the descriptor information at descriptor number 17 is read, the count of pieces of descriptor information that have been read coincides with the transferable frame count 17. Hence, the transfer determination part 130 outputs control information 20 included in the descriptor information of until descriptor number 17, to the data transfer part 140, and the data transfer part 140 conducts data transfer according to the control information 20. The forward skip control part 132 outputs next-descriptor number 18 included in the descriptor information at descriptor number 17, as the next-activation head address 21.

As described above, the DMA control device 100 according to Embodiment 2 skips reading the descriptor information of frames that have been transferred in and before the last activation. This can reduce unnecessary reading time.

Embodiment 3.

Embodiment 3 will explain a DMA control device 100 that has the functions of both Embodiments 1 and 2.

Figure 5:
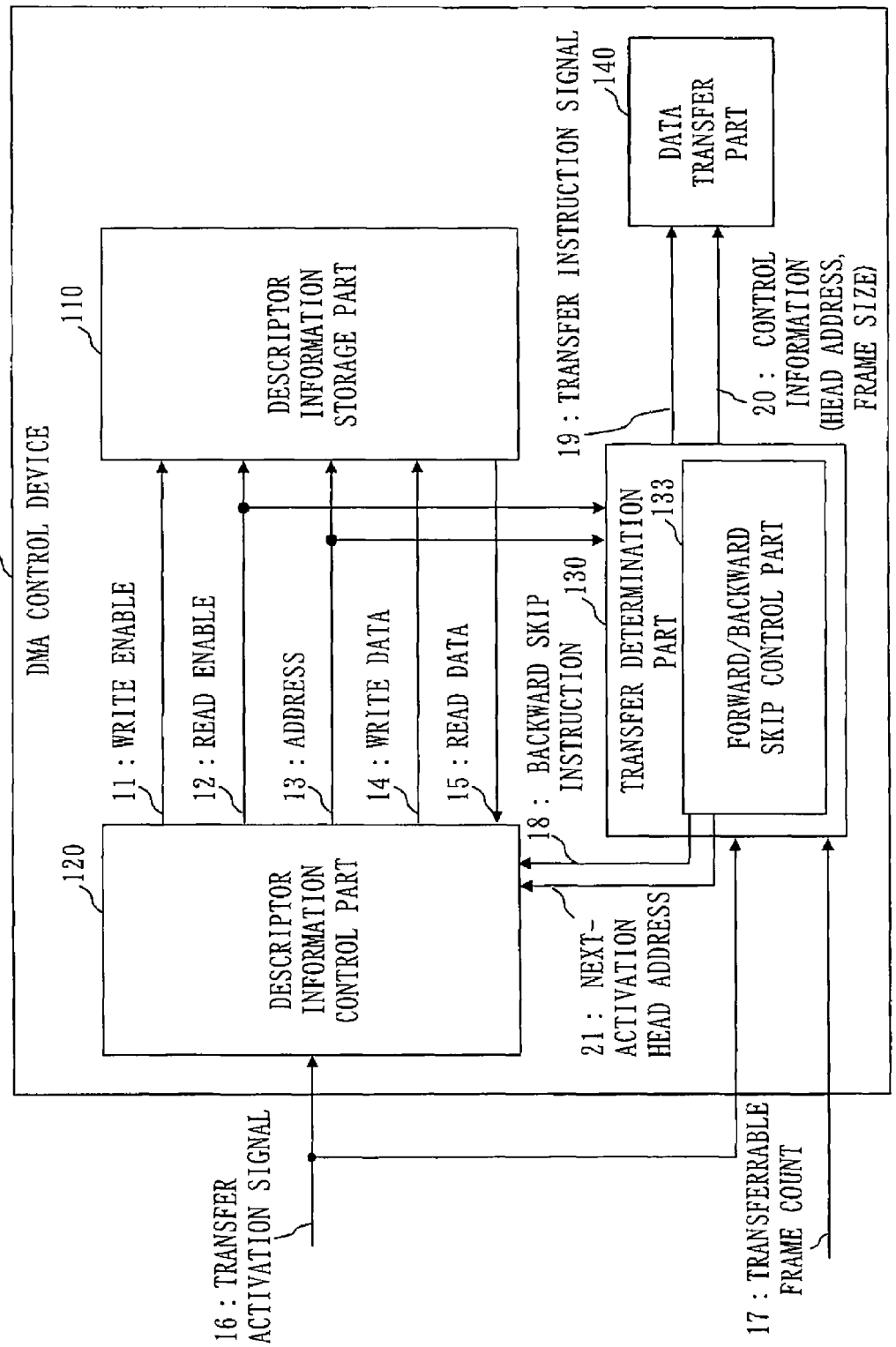
FIG. 5 is a block diagram illustrating the function of a DMA control device 100 according to Embodiment 3.

FIG. 5 is a block diagram illustrating the function of the DMA control device 100 according to Embodiment 3.

The DMA control device 100 illustrated in FIG. 5 is different from the DMA control device 100 illustrated in FIG. 1 in that a transfer determination part 130 includes a forward/backward skip control part 133 in place of a backward skip control part 131.

The forward/backward skip control part 133 starts taking the count of pieces of descriptor information (that is, the count of frames to be transferred) that have been read by a descriptor information control part 120 since immediately after a transfer activation signal 16 is asserted. If the count of pieces of descriptor information that have been read coincides with a transferable frame count 17 asserted by a CPU, the forward/backward skip control part 133 asserts a backward skip instruction 18 for the descriptor information control part 120. If the count of pieces of descriptor information that have been read coincides with the transferable frame count 17 asserted by the CPU, the forward/backward skip control part 133 outputs the next-descriptor number included in the descriptor information to the descriptor information control part 120 as a next-activation head address 21.

When the backward skip instruction 18 is asserted, the descriptor information control part 120 skips the next and subsequent reading from a descriptor information storage part 110, and reads the last descriptor information. When a new transfer activation signal 16 is asserted, the descriptor information control part 120 uses the next-activation head address 21 as the reading start address of the descriptor information storage part 110.

Figure 6:
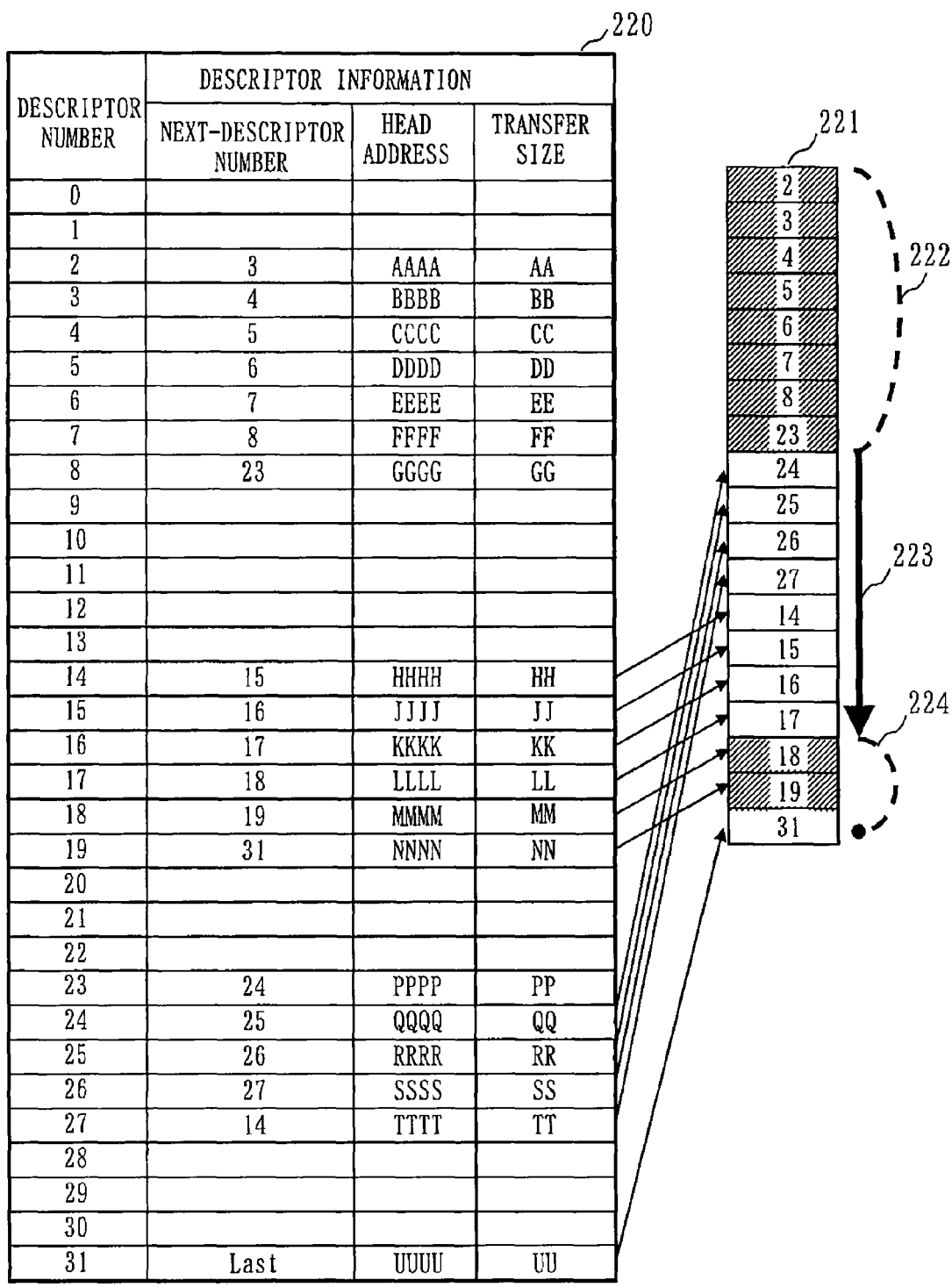
FIG. 6 is an explanatory illustration of the operation of the DMA control device 100 according to Embodiment 3.

FIG. 6 is an explanatory illustration of the operation of the DMA control device 100 according to Embodiment 3.

A table 220 expresses information stored by the descriptor information storage part 110. The table 220 illustrated in FIG. 6 is the same as the table 210 illustrated in FIG. 4.

An array 221 is composed of descriptor numbers arranged according to the order in the descriptor chain.

Assume that the count of frames that can be transferred by a single transfer activation is limited to 8. In this case, the descriptor information control part 120 reads the descriptor information of until descriptor number 23 sequentially. Then, the transfer determination part 130 outputs control information 20 included in the descriptor information that have been read, to the data transfer part 140. The data transfer part 140 transfers data according to the control information 20.

When the descriptor information at descriptor number 23 is read, the count of pieces of descriptor information that have been read coincides with the transferable frame count 17. Hence, the forward/backward skip control part 133 asserts the backward skip instruction 18, and outputs the next-descriptor number 24 included in the descriptor information at descriptor number 23, as the next-activation head address 21. Then, the descriptor information control part 120 skips subsequent reading of until last descriptor number 31.

In the second transfer activation, the descriptor information control part 120 skips reading descriptor information of until descriptor number 23 according to the next-activation head address 21, as indicated by a broken line 222, and starts reading with descriptor number 24, as indicated by an arrow 223. The descriptor information control part 120 reads descriptor information sequentially from descriptor number 24 through descriptor number 17, as indicated by the arrow 223. Then, the transfer determination part 130 outputs control information 20 included in the descriptor information that have been read, to the data transfer part 140. The data transfer part 140 conducts data transfer according to the control information 20.

When the descriptor information at descriptor number 17 is read, the count of pieces of descriptor information that have been read coincides with the transferable frame count 17. Hence, the forward/backward skip control part 133 asserts the backward skip instruction 18, and outputs the next-descriptor number 18 included in the descriptor information at descriptor number 17, as the next-activation head address 21. Then, the descriptor information control part 120 skips subsequent reading of until last descriptor number 31.

As described above, when descriptor information corresponding to the transferable frames are read, the DMA control device 100 according to Embodiment 3 asserts the backward instruction 18 and skips reading the descriptor information of subsequent frames. The DMA control device 100 according to Embodiment 3 also skips reading the descriptor information of the frames that have been transferred in and before the next activation. This can reduce unnecessary reading time.

Embodiment 4.

Embodiment 4 will explain a DMA control device 100 which certainly transfers frames of a type that needs to be transferred absolutely but partly skips transferring frames of a type that need not always be entirely transferred by a single transfer activation.

FIG. 7 is an explanatory illustration of the operation of a DMA control device 100 according to Embodiment 4.

FIG. 7 illustrates the operation of the DMA control device 100 according to Embodiment 1 illustrated in FIG. 1.

A table 230 expresses information stored by the descriptor information storage part 110. The table 230 illustrated in FIG. 7 is different from the table 200 illustrated in FIG. 2 in additionally having frame types.

Assume that only a frame type β is subject to frame count limitation in terms of the count of frames to be transferred by a single transfer activation by the transferable frame count 17, while frames of the other types are transferred by every transfer activation.

An array 231 is composed of descriptor numbers arranged according to the order in the descriptor chain.

Assume that the count of frames that can be transferred by a single transfer activation is limited to 4. In this case, the descriptor information control part 120 reads the descriptor information of a frame type β sequentially from descriptor number 2 through descriptor number 8, as indicated by an arrow 232. The descriptor information control part 120 also reads the descriptor information of a frame type β sequentially from descriptor number 23 through descriptor number 26, as indicated by an arrow 233. Then, the transfer determination part 130 outputs control information 20 included in the descriptor information that have been read, to the data transfer part 140. The data transfer part 140 transfers data according to the control information 20.

When the descriptor information at descriptor number 26 is read, the count of pieces of descriptor information of the frame type β and attached with transfer complete flag 0, that have been read coincides with the transferable frame count 17. Hence, the backward skip control part 131 asserts the backward skip instruction 18. Then, the descriptor information control part 120 skips subsequent reading of until last descriptor number 31, as indicated by a broken line 234.

The transfer complete flags of the descriptor information corresponding to the frames transferred change from 0 to 1. These frames will not be transferred by the next and subsequent activations.

Figure 8:
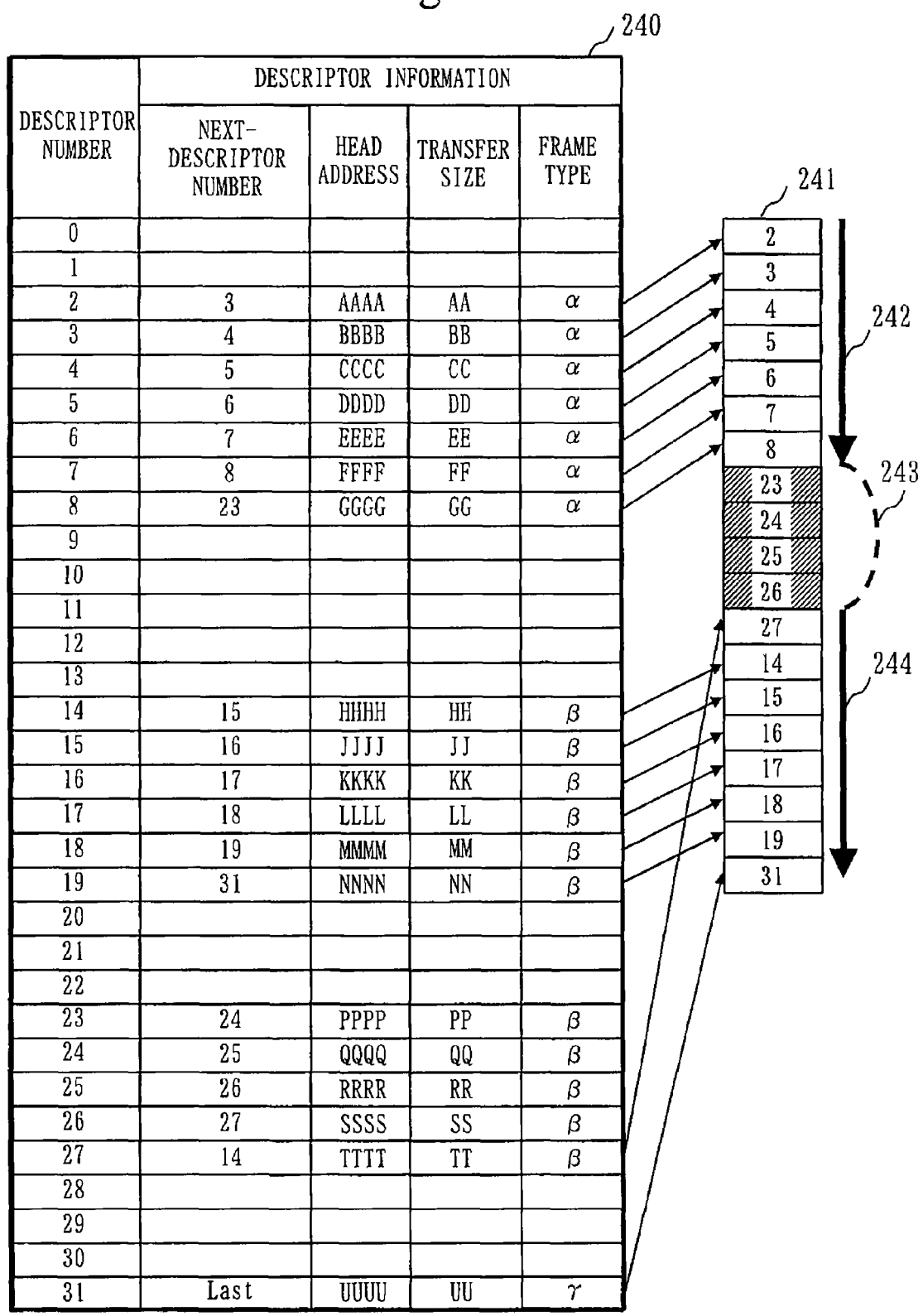
FIG. 8 is an explanatory illustration of the operation of the DMA control device 100 according to Embodiment 4.

FIG. 8 is an explanatory illustration of the operation of the DMA control device 100 according to Embodiment 4. FIG. 8 illustrates the operation of the DMA control device 100 according to Embodiment 2 illustrated in FIG. 3.

A table 240 expresses information stored by the descriptor information storage part 110. The table 240 illustrated in FIG. 8 is different from the table 210 illustrated in FIG. 4 in additionally having frame types.

Assume that only the frame type β is subject to frame count limitation in terms of the count of frames to be transferred by a single transfer activation by the transferable frame count 17, while frames of the other types are transferred by every transfer activation.

An array 241 is composed of descriptor numbers arranged according to the order in the descriptor chain.

Assume that the count of frames that can be transferred by a single transfer activation is limited to 4. In this case, the descriptor information control part 120 reads the descriptor information of until last descriptor number 31 sequentially.

When the descriptor information at descriptor number 26 is read, the count of pieces of descriptor information of the frame type β that have been read coincides with the transferable frame count 17. Hence, the transfer determination part 130 outputs the control information 20 included in the descriptor information of until the descriptor information at descriptor number 26, to the data transfer part 140. The data transfer part 140 transfers data according to the control information 20. The forward skip control part 132 outputs the next-descriptor number 27 included in the descriptor information at descriptor number 26, as the next-activation head address 21.

In the second transfer activation, the descriptor information control part 120 reads the descriptor information of the frame type α from descriptor number 2 through descriptor number 8, as indicated by an arrow 242. The descriptor information control part 120 also skips reading descriptor information of until descriptor number 26 according to the next-activation head address 21, as indicated by a broken line 232, and starts reading with descriptor number 27, as indicated by an arrow 244. The descriptor information control part 120 reads descriptor information sequentially from descriptor number 27 through descriptor number 31, being the last descriptor information, as indicated by the arrow 244.

When the descriptor information at descriptor number 16 is read, the count of pieces of descriptor information of the frame type β that have been read coincides with the transferable frame count 17. Hence, the transfer determination part 130 outputs the control information 20 included in the descriptor information of until descriptor number 16, to the data transfer part 140. The data transfer part 140 transfers data according to the control information 20. The forward skip control part 132 outputs next-descriptor number 17 included in the descriptor information at descriptor number 16, as the next-activation head address 21.

Figure 9:
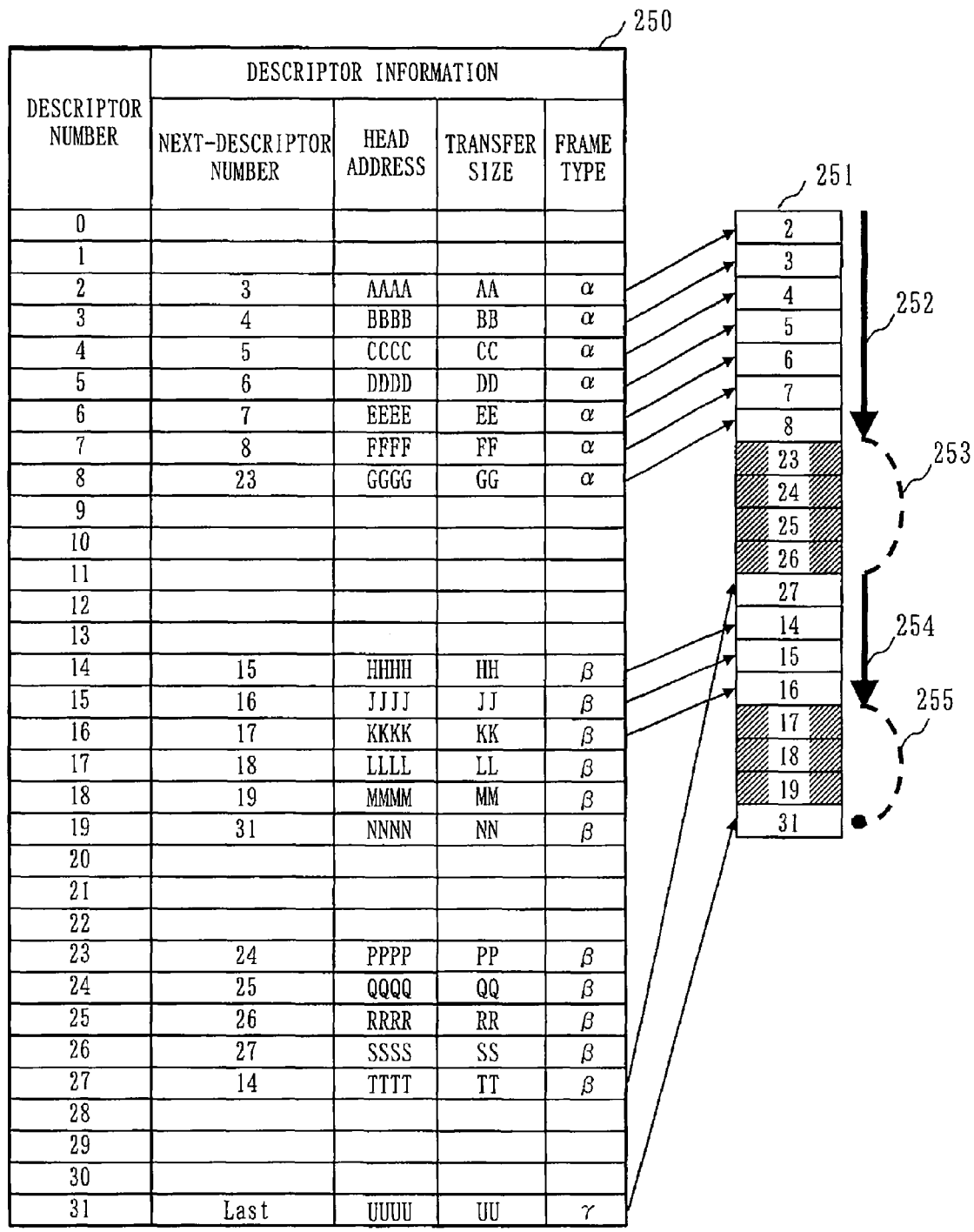
FIG. 9 is an explanatory illustration of the operation of the DMA control device 100 according to Embodiment 4.

FIG. 9 is an explanatory illustration of the operation of the DMA control device 100 according to Embodiment 4. FIG. 9 illustrates the operation of the DMA control device 100 according to Embodiment 3 illustrated in FIG. 5.

A table 250 expresses information stored by the descriptor information storage part 110. The table 250 illustrated in FIG. 9 is different from the table 220 illustrated in FIG. 6 in additionally having frame types.

Assume that only frames of the frame type β are subject to frame count limitation that limits, using the transferable frame count 17, the count of frames to be transferred by a single transfer activation, while frames of the other types are transferred by every transfer activation.

An array 251 is composed of descriptor numbers arranged according to the order in the descriptor chain.

Assume that the count of frames that can be transferred by a single transfer activation is limited to 4. In this case, the descriptor information control part 120 reads the descriptor information of the frame type α sequentially from descriptor number 2 through descriptor number 8. The descriptor information control part 120 also reads the descriptor information of the frame type β sequentially from descriptor number 23 through descriptor number 26. Then, the transfer determination part 130 outputs control information 20 included in the descriptor information that have been read, to the data transfer part 140. The data transfer part 140 transfers data according to the control information 20.

When the descriptor information at descriptor number 26 is read, the count of pieces of descriptor information of the frame type β, that have been read coincides with the transferable frame count 17. Hence, the forward/backward skip control part 133 asserts the backward skip instruction 18 and outputs the next-descriptor number 27 included in the descriptor information at descriptor number 26, as the next-activation head address 21. Then, the descriptor information control part 120 skips subsequent reading of until last descriptor number 31.

In the second transfer activation, the descriptor information control part 120 reads the descriptor information of the frame type α from descriptor number 2 through descriptor number 8, as indicated by an arrow 252. The descriptor information control part 120 also skips reading descriptor information of until descriptor number 26 according to the next-activation head address 21, as indicated by a broken line 253, and starts reading with descriptor number 27, as indicated by an arrow 254. The descriptor information control part 120 reads descriptor information sequentially from descriptor number 27 through descriptor number 16, as indicated by the arrow 254. Then, the transfer determination part 130 outputs the control information 20 included in the descriptor information that have been read, to the data transfer part 140. The data transfer part 140 transfers data according to the control information 20.

When the descriptor information at descriptor number 16 is read, the count of pieces of descriptor information of the frame type β that have been read coincides with the transferable frame count 17. Hence, the forward/backward skip control part 133 asserts the backward skip instruction 18 and outputs next-descriptor number 17 included in the descriptor information at descriptor number 16, as the next-activation head address 21. Then, the descriptor information control part 120 skips subsequent reading of until last descriptor number 31, as indicated by a broken line 255.

As described above, the DMA control device 100 according to Embodiment 4 transfers frames of a type that needs to be transferred absolutely but partly skips transferring frames of a type that need not always be entirely transferred by a single transfer activation.

In the embodiments described above, each "part" in the "descriptor information control part 120", "transfer determination part 130", "backward skip control part 131", "forward skip control part 132", "forward/backward skip control part 133", and "data transfer part 140" is formed of a circuit, software, or hardware.

Thus, each "part" may be interpreted as a "circuit". Similarly, each "part" may be interpreted as a "process", "program", "means", "procedure", "function", "device", or "instrument".

If each "part" is formed of software, it is stored in a storage device such as a RAM (Random Access Memory), and read and executed by a processing device such as a CPU (Central Processing Unit) or arithmetic circuit.

REFERENCE SIGNS LIST

100: DMA control device; 110: descriptor information storage part; 120: descriptor information control part; 130: transfer determination part; 131: backward skip control part; 132: forward skip control part; 133: forward/backward skip control part; 140: data transfer part

The invention claimed is:

1. A data transfer device comprising:
   processing circuitry
   to store descriptor information including control information of data transfer;
   to sequentially read the descriptor information that has been stored when a transfer activation signal is asserted;
   to take a count of pieces of descriptor information that has been read; and as long as the count taken is equal to or less than a predetermined transferable frame count, output control information included in the descriptor information, and when the count taken coincides with the transferable frame count, output a skip instruction;
   to transfer data according to the control information that has been outputted; and
   to skip reading remaining descriptor information when the skip instruction is outputted and subsequently read a last descriptor of the descriptor information.

2. The data transfer device according to claim 1, wherein the processing circuitry
   stores a transfer complete flag for each piece of descriptor information to indicate whether or not transfer is completed, and
   as long as the count taken is equal to or less than the transferable frame count, outputs the control information and changes the transfer complete flag of the descriptor information that includes the control information, to represent transfer complete.

3. The data transfer device according to claim 1,
   wherein the descriptor information includes an identifier of descriptor information to be read next, and
   wherein the processing circuitry,
   when the count taken coincides with the transferable frame count, outputs the skip instruction and outputs the identifier included in descriptor information which is read at the time the transferable frame count is reached, and
   when a new transfer activation signal is asserted, reads descriptor information sequentially starting with descriptor information indicated by the identifier that has been outputted.

4. The data transfer device according to claim 1,
   wherein the descriptor information includes type information indicating a type, and
   wherein the processing circuitry takes a count of pieces of descriptor information of some type out of the descriptor information that has been read.

5. A data transfer device according to claim 1, wherein:
   the skip instruction comprises a backward skip instruction.

6. A data transfer method comprising:
   sequentially reading the descriptor information from a storage device which stores descriptor information including control information of data transfer, when a transfer activation signal is asserted;
   taking a count of pieces of descriptor information that has been read; and as long as the count taken is equal to or less than a predetermined transferable frame count, outputting control information included in the descriptor information, and when the count taken coincides with the transferable frame count, outputting a skip instruction;
   transferring data according to the control information that has been outputted; and
   skipping reading remaining descriptor information when a skip instruction is outputted and subsequently reading a last descriptor of the descriptor information.

7. The data transfer method according to claim 6, wherein:
   the skip instruction comprises a backward skip instruction.

* * * * *